(12) United States Patent
Grestenberger et al.

(10) Patent No.: US 11,053,379 B2
(45) Date of Patent: Jul. 6, 2021

(54) HETEROPHASIC PROPYLENE COPOLYMER WITH LOW CLTE

(71) Applicant: BOREALIS AG, Vienna (AT)

(72) Inventors: Georg Grestenberger, St. Peter in der Au (AT); Daniela Mileva, Pichling (AT); Susanne Kahlen, Leonding (AT)

(73) Assignee: BOREALIS AG, Vienna (AT)

( * ) Notice: Subject to any disclaimer, the term of this patent is extended or adjusted under 35 U.S.C. 154(b) by 448 days.

(21) Appl. No.: 16/070,742

(22) PCT Filed: Jan. 27, 2017

(86) PCT No.: PCT/EP2017/051705
§ 371 (c)(1),
(2) Date: Jul. 17, 2018

(87) PCT Pub. No.: WO2017/129711
PCT Pub. Date: Aug. 3, 2017

(65) Prior Publication Data
US 2021/0061982 A1 Mar. 4, 2021

(30) Foreign Application Priority Data

Jan. 29, 2016 (EP) .................................. 161533708

(51) Int. Cl.
*C08L 23/12* (2006.01)

(52) U.S. Cl.
CPC .......... *C08L 23/12* (2013.01); *C08L 2205/025* (2013.01); *C08L 2207/02* (2013.01)

(58) Field of Classification Search
None
See application file for complete search history.

(56) References Cited

U.S. PATENT DOCUMENTS

| | | | | |
|---|---|---|---|---|
| 10,221,305 B2 * | 3/2019 | Grestenberger | ........ | C08L 23/12 |
| 10,647,838 B2 * | 5/2020 | Grestenberger | ........ | C08L 23/12 |
| 10,696,834 B2 * | 6/2020 | Grestenberger | ........ | C08L 23/14 |

FOREIGN PATENT DOCUMENTS

| | | | | |
|---|---|---|---|---|
| EA | 201201314 A1 | 3/2013 | | |
| EP | 0491566 B1 | 9/1992 | | |
| EP | 0586390 B1 | 3/1994 | | |
| EP | 0591224 B1 | 4/1994 | | |
| EP | 0887379 A1 | 12/1998 | | |
| EP | 2530117 A1 | 12/2012 | | |
| EP | 2573134 A1 | 3/2013 | | |
| EP | 2731989 B1 * | 6/2015 | ............ | C08F 210/06 |
| WO | 87/07620 A1 | 12/1987 | | |
| WO | 92/12182 A1 | 7/1992 | | |
| WO | 92/19653 A1 | 11/1992 | | |
| WO | 99/24479 A1 | 10/1994 | | |
| WO | 99/24478 A1 | 5/1999 | | |
| WO | 00/68315 A1 | 11/2000 | | |
| WO | 2004/000899 A1 | 12/2003 | | |
| WO | 2004/111095 A1 | 12/2004 | | |
| WO | 2010/142540 A1 | 12/2010 | | |
| WO | 2012/062734 A1 | 5/2012 | | |
| WO | 2013/010877 A1 | 1/2013 | | |
| WO | 2015/070360 A1 | 5/2015 | | |

OTHER PUBLICATIONS

Gahleitner, M. et al., eds. Ullmann's Encyclopedia of Industrial Chemistry. "Polypropylene". Mar. 26, 2014. (Year: 2014).*
Russian Office action for Patent No. 2018130107/04(048749), dated Apr. 22, 2019.
Zweifel, et al., "Plastics Additives Handbook", 5th Edition, Department of Materials, Institute of Polymers, 2001.
Zhou et al., "A new decoupling method for accurate quantification of polyethylene copolymer composition and triad sequence distribution with 13C NMR", Journal of Magnetic Resonance 187 (2007) pp. 225-233.
Wang et al., "Structural Analysis of Ethylene/Propylene Copolymers Synthesized with a Constrained Geometry Catalyst", Macromolecules 2000, 33, pp. 1157-1162.
Singh et al., "Triad sequence determination of ethylene-propylene copolymers—application of quantitative 13C NMR", Polymer Testing 28 (2009) pp. 475-479.
Resconi et al., "Selectivity in Propene Polymerization with Metallocene Catalysts", Chem. Rev. 2000, 100, pp. 1253-1345.
Kakugo et al., "13C NMR Determination of Monomer Sequence Distribution in Ethylene-Propylene Copolymers Prepared with d-TiC13-Al(C2H5)2C1" Macromolecules 1982, 15, pp. 1150-1152.
H.N.Cheng, "13C NMR Analysis of Ethylene-Propylene Rubbers", Macromolecules 1984, 17, 1950-1955.
Busico et al., "Alk-1-ene Polymerization in the Presence of a Monocyclopentadienyl Zirconium(IV)Acetamidinate Catalyst: Microstructural and Mechanistic Insightsa", Macromol. Rapid Commun. 2007, 28, pp. 1128-1134.

* cited by examiner

*Primary Examiner* — Richard A Huhn
(74) *Attorney, Agent, or Firm* — Tarolli, Sundheim, Covell & Tummino LLP

(57) ABSTRACT

A heterophasic propylene copolymer (HECO) comprising a polypropylene matrix having a melt flow rate $MFR_2$ (230° C.) in the range of 45 to 75 g/10 min for the preparation of molde articles with low CLTE.

15 Claims, No Drawings

HETEROPHASIC PROPYLENE COPOLYMER WITH LOW CLTE

The present invention is directed to a new heterophasic propylene copolymer as well as to a polyolefin composition comprising said heterophasic propylene copolymer.

In the automotive industry there is recent demand towards weight reduction and improvement in dimensional stability of the final parts. Accordingly various automotive applications such as bumper or door claddings are made out of advanced polypropylene materials. These polypropylene materials are usually heterophasic polypropylene propylene copolymers, where a (semi)crystalline polypropylene forms the continuous phase in which an elastomeric propylene copolymer is dispersed.

The need to reduce the thermal expansion coefficient (CLTE) of such heterophasic polypropylene propylene copolymers is of high interest in this area as they are usually combined with metals. One of the traditional concepts for reducing the coefficient of thermal expansion is to add a second component such as inorganic filler or external elastomer. However, higher concentrations of inorganic fillers are not desirable due to weight increase. On top of the thermo mechanical property profile also low shrinkage polymers (lower than 0.8%) are very often required for automotive applications. Beside the good dimensional stability, the ductile behavior at cold temperatures and high stiffness at ambient conditions are other necessary requirements for an advanced heterophasic propylene copolymer materials. Fulfillment of the complete thermo-mechanical and dimensional-stability material profile has always been a challenge due to the antagonistic effects of the particular properties.

Thus the object of the present invention is to provide a new heterophasic propylene copolymer which results with an external polymer and/or inorganic filler in a polyolefin composition with high flow rate, low shrinkage, low coefficient of linear thermal expansion and at the same time preserving good balance of mechanical properties such as stiffness, impact strength and elongation at break.

Accordingly the present invention is directed in a $1^{st}$ embodiment to a heterophasic propylene copolymer (HECO) comprising
(a) a (semi)crystalline polypropylene (PP) having a melt flow rate $MFR_2$ (230° C.) measured according to ISO 1133 in the range of 42 to 75 g/10 min; and
(b) an elastomeric propylene copolymer (ESC) dispersed in said (semi)crystalline polypropylene (PP)
wherein said heterophasic propylene copolymer (HECO) has
(i) a xylene cold soluble (XCS) fraction in the range of 25 to 38 wt.-%;
wherein further the xylene cold soluble (XCS) fraction of said heterophasic propylene copolymer (HECO) has
(ii) a comonomer content in the range of 30.0 to 65.0 mol-%; and
(iii) an intrinsic viscosity (IV) in the range of 1.70 to 2.30 dl/g.

Preferably the intrinsic viscosity (IV) of the xylene cold insoluble (XCI) fraction of the heterophasic propylene copolymer (HECO) of the $1^{st}$ embodiment is in the range of 1.15 to 1.35 dl/g.

In a $2^{nd}$ embodiment the present invention is directed to a heterophasic propylene copolymer (HECO) comprising
(a) a (semi)crystalline polypropylene (PP); and
(b) an elastomeric propylene copolymer (ESC) dispersed in said (semi)crystalline polypropylene (PP)
wherein said heterophasic propylene copolymer (HECO) has
(i) a xylene cold soluble (XCS) fraction in the range of 25 to 38 wt.-%;
wherein further the xylene cold soluble (XCS) fraction of said heterophasic propylene copolymer (HECO) has
(ii) a comonomer content in the range of 30.0 to 65.0 mol-%; and
(iii) an intrinsic viscosity (IV) in the range of 1.70 to 2.30 dl/g.
and wherein still further
(iv) the xylene cold insoluble (XCI) fraction of the heterophasic propylene copolymer (HECO) has an intrinsic viscosity (IV) in the range of 1.15 to 1.35 dl/g.

Preferably the (semi)crystalline polypropylene (PP) of the heterophasic propylene copolymer (HECO) of the $2^{nd}$ embodiment has a melt flow rate $MFR_2$ (230° C.) measured according to ISO 1133 in the range of 42 to 75 g/10 min.

The following preferred embodiments apply to the $1^{st}$ and $2^{nd}$ embodiments as defined above.

Preferably said heterophasic propylene copolymer (HECO) has a melt flow rate $MFR_2$ (230° C.) measured according to ISO 1133 in the range of 18 to 40 g/10 min and/or a comonomer content in the range of 8.5 to 25 mol-%.

In a preferred embodiment the heterophasic propylene copolymer (HECO) according to the $1^{st}$ and $2^{nd}$ embodiments complies with the in-equation (3)

$$\frac{MFR(M)}{MFR(T)} \leq 4.0 \qquad (3)$$

wherein
MFR (M) is the melt flow rate $MFR_2$ (230° C.) measured according to ISO 1133 (g/10 min) of the (semi)crystalline polypropylene (PP);
MFR (T) is the melt flow rate $MFR_2$ (230° C.) measured according to ISO 1133 (g/10 min) of the heterophasic propylene copolymer (HECO).

Alternatively or additionally to the previous paragraph the heterophasic propylene copolymer (HECO) according to the $1^{st}$ and $2^{nd}$ embodiments complies with in-equation (2)

$$1.00 \leq \frac{IV(XCS)}{IV(XCI)} \leq 2.00 \qquad (2)$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

In a $3^{rd}$ embodiment the present invention is directed to a heterophasic propylene copolymer (HECO) comprising
(a) a (semi)crystalline polypropylene (PP) having a melt flow rate $MFR_2$ (230° C.) measured according to ISO 1133 in the range of 42 to 75 g/10 min;
(b) an elastomeric propylene copolymer (ESC) dispersed in said (semi)crystalline polypropylene (PP); and
wherein said heterophasic propylene copolymer (HECO)
(i) has a xylene cold soluble (XCS) fraction in the range of 27 to 35 wt.-%, having a comonomer content in the range of 30.0 to 65.0 mol-% and an intrinsic viscosity (IV) in the range of 1.90 to 2.18 dl/g;

(ii) has melt flow rate MFR$_2$ (230° C.) measured according to ISO 1133 in the range of 18 to 35 g/10 min;
(iii) complies with the in-equation (2)

$$1.40 \leq \frac{IV(XCS)}{IV(XCI)} \leq 1.80 \quad (2)$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

Preferably the heterophasic propylene copolymer (HECO) according to the 3$^{rd}$ embodiment complies with the in-equation (3)

$$\frac{MFR(M)}{MFR(T)} \leq 4.0 \quad (3)$$

wherein
MFR (M) is the melt flow rate MFR$_2$ (230° C.) measured according to ISO 1133 (g/10 min) of the (semi)crystalline polypropylene (PP);
MFR (T) is the melt flow rate MFR$_2$ (230° C.) measured according to ISO 1133 (g/10 min) of the heterophasic propylene copolymer (HECO).

Preferably heterophasic propylene copolymer (HECO) according to the 3$^{rd}$ embodiment has a comonomer content in the range of 8.5 to 25 mol-%.

Still more preferably the intrinsic viscosity (IV) of the xylene cold insoluble (XCI) fraction of the heterophasic propylene copolymer (HECO) according to the 3$^{rd}$ embodiment is in the range of 1.15 to 1.35 dug.

Yet more preferably the (semi)crystalline polypropylene (PP) of the heterophasic propylene copolymer (HECO) according to the 3$^{rd}$ embodiment is a (semi)crystalline propylene homopolymer (H-PP) preferably having a xylene cold soluble (XCS) fraction of less than 4.5 wt.-% and/or the elastomeric propylene copolymer (ESC) of the heterophasic propylene copolymer (HECO) according to the 3$^{rd}$ embodiment is an ethylene propylene rubber (EPR).

In a further aspect the present invention is directed to a polyolefin composition (PO) comprising a comprising heterophasic propylene copolymer (HECO) according to one of the 1$^{st}$ to 3$^{rd}$ embodiment indicated above.

Thus the present invention is also directed to a polyolefin composition (PO) comprising
(a) at least 65 wt.-%, based on the total weight of the polyolefin composition (PO), of the heterophasic propylene copolymer (HECO) as defined herein;
and as further component(s)
(b1) 2 to 15 wt.-%, based on the total weight of the polyolefin composition (PO), of a high density polyethylene (HDPE) having a density in the range of 950 to 970 kg/m$^3$;
and/or
(b2) 5 to 20 wt.-%, based on the total weight of the polyolefin composition (PO), of an inorganic filler (F).

Thus in one specific aspect the polyolefin composition (PO) comprises (a) 70 to 90 wt.-%, based on the total weight of the polyolefin composition (PO), of a heterophasic propylene copolymer (HECO) according to the 3$^{rd}$ embodiment; and
(b1) 2 to 15 wt.-%, based on the total weight of the polyolefin composition (PO), of a high density polyethylene (HDPE) having a density in the range of 950 to 970 kg/m$^3$;
and/or
(b2) 5 to 20 wt.-%, based on the total weight of the polyolefin composition (PO), of an inorganic filler (F);

In a further specific embodiment the polyolefin composition (PO) consists of
(a1) at least 75 wt.-%, preferably 85 to 97 wt.-%, based on the total weight of the polyolefin composition (PO), of the heterophasic propylene copolymer (HECO) according to 1$^{st}$, 2$^{nd}$ or 3$^{rd}$ embodiment;
(b1) 2 to 15 wt.-%, preferably 4 to 15 wt.-%, based on the total weight of the polyolefin composition (PO), of the high density polyethylene (HDPE) as defined herein;
(c1) optionally up to 5.0 wt.-%, preferably 2.0×10$^{-5}$ to 2.0 wt.-%, based on the total weight of the polyolefin composition (PO), of alpha nucleating agents (NU); and
(d1) optionally up to 8.0 wt.-%, preferably 0.5 to 4.0 wt.-%, based on the total weight of the polyolefin composition (PO), of additives (AD);
or
(a2) at least 75 wt.-%, preferably 75 to 99 wt.-%, more preferably 85 to 97 wt.-%, on the total weight of the polyolefin composition (PO), of the heterophasic propylene copolymer (HECO) according to 1$^{st}$, 2$^{nd}$ or 3$^{rd}$ embodiment;
(b2) 2 to 15 wt.-%, preferably 7 to 15 wt.-%, preferably 8 to 12 wt.-%, based on the total weight of the polyolefin composition (PO), of the inorganic filler (F);
(c2) optionally up to 5.0 wt.-%, preferably 1.0×10$^{-5}$ to 4.0 wt.-%, preferably 2.0×10$^{-5}$ to 2.0 wt.-%, based on the total weight of the polyolefin composition (PO), of alpha nucleating agents (NU); and
(d2) optionally up to 8.0 wt.-%, preferably 0.1 to 6.0 wt.-%, preferably 0.5 to 4.0 wt.-%, based on the total weight of the polyolefin composition (PO), of additives (AD).

In yet a further prefered embdoment the polyolefin composition (PO) consists of
(a) 70 to 90 wt.-%, preferably 75 to 85 wt.-%, based on the total weight of the polyolefin composition (PO), of the heterophasic propylene copolymer (HECO) according to 1$^{st}$, 2$^{nd}$ or 3$^{rd}$ embodiment;
(b) 2 to 15 wt.-%, preferably 4 to 15 wt.-%, based on the total weight of the polyolefin composition (PO), of the high density polyethylene (HDPE); and
(c) 5 to 20 wt.-%, preferably 8 to 15 wt.-%, based on the total weight of the polyolefin composition (PO), of the inorganic filler (F);
(d) 10$^{-5}$ to 2.0 wt.-%, based on the total weight of the polyolefin composition (PO), of alpha nucleating agents (NU); and
(e) optionally up to 8.0 wt.-%, preferably 0.5 to 4.0 wt.-%, based on the total weight of the polyolefin composition (PO), of additives (AD).

Preferably the weight ratio between the inorganic filler (F) and the high density polyethylene (HDPE) [(F)/(HDPE)] is at least 0.6.

The high density polyethylene (HDPE) preferably has a melt flow rate MFR$_2$ (190° C.) measured according to ISO 1133 in the range of 20 to 80 g/10 min and/or the inorganic filler (F) has a cutoff particle size d95 [mass percent] of equal or below 20 μm.

In a preferred embodiment the weight ratio between the xylene cold soluble (XCS) fraction of the heterophasic propylene copolymer (HECO) and the high density polyethylene (HDPE) [(XCS)/(HDPE)] is above 2.0.

In an especially preferred embodiment the polyolefin composition (PO) has
(a) tensile modulus of at least 1100 MPa,
and/or
(b) impact strength at +23° C. of at least 20 kJ/m², and/or
(c) a coefficient of linear thermal expansion (CLTE) performed in a temperature range from −30 to +80° C. of not more than 80 μm/mK.

Additionally the present invention is directed to an automotive article comprising a heterophasic propylene copolymer (HECO) as defined herein or a polyolefin composition (PO) as defined herein.

Preferably, the automotive article is an exterior automotive article.

The present invention is further directed to a process for the preparation of the heterophasic propylene copolymer (HECO) according to this invention wherein the heterophasic propylene copolymer (HECO) is obtained by producing the (semi)crystalline polypropylene (PP) in a first reaction zone comprising at least one reactor, transferring said (semi) crystalline polypropylene (PP) in a subsequent reaction zone comprising at least one reactor, where in the presence of the (semi)crystalline polypropylene (PP) the elastomeric propylene copolymer (ESC) is produced.

The present invention is also directed to a process for the preparation of the polyolefin composition (PO) as defined herein by extruding the heterophasic propylene copolymer (HECO), the high density polyethylene (HDPE), and optionally the inorganic filler (F) in an extruder, wherein preferably the heterophasic propylene copolymer (HECO) is preferably obtained according to the process as defined in the previous paragraph, more preferably according to the process as defined in more detail below.

In the following the invention is defined in more detail.

The Heterophasic Propylene Copolymer (HECO)

The heterophasic propylene copolymer (HECO) according to this invention comprises a (semi)crystalline polypropylene (PP) as a matrix in which an elastomeric propylene copolymer (ESC) is dispersed. The expression "heterophasic propylene copolymer" or "heterophasic" as used in the instant invention indicates that the elastomeric propylene copolymer (ESC) is (finely) dispersed in the (semi)crystalline polypropylene (PP). In other words the (semi)crystalline polypropylene (PP) constitutes a matrix in which the elastomeric propylene copolymer (ESC) forms inclusions in the matrix, i.e. in the (semi)crystalline polypropylene (PP). Thus the matrix contains (finely) dispersed inclusions being not part of the matrix and said inclusions contain the elastomeric propylene copolymer (ESC). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

The heterophasic propylene copolymer (HECO) preferably has a melt flow rate MFR₂ (230° C., 2.16 kg) in the range of 18 to 40 g/10 min, more preferably in the range of 18 to 35 g/10 min, yet more preferably in the range of 20 to 30 g/10 min.

In one embodiment the heterophasic propylene copolymer (HECO) has
(a) tensile modulus of at least 900 MPa,
and/or
(b) impact strength at +23° C. of at least 25 kJ/m², and/or
(c) a coefficient of linear thermal expansion (CLTE) performed in a temperature range from −30 to +80° C. of not more than 125 μm/mK.

As mentioned above, the heterophasic propylene copolymer (HECO) according to this invention preferably comprises
(a) a (semi)crystalline polypropylene (PP) as the matrix (M) and
(b) an elastomeric propylene copolymer (ESC).

Preferably the weight ratio between the (semi)crystalline polypropylene (PP) and the elastomeric propylene copolymer (ESC) [PP/ESC] of the heterophasic propylene copolymer (HECO) is in the range of 50/50 to 85/15, more preferably in the range of 60/40 to 80/20.

Preferably, the heterophasic propylene copolymer (HECO) has a comonomer content, preferably a content of ethylene and/or C₄ to C₁₂ α-olefin, more preferably an ethylene content, in the range of 8 to 30 mol.-%, like 20 to 30 mol.-% or 8 to 25 mol.-%, more preferably in the range of 12 to 27 mol.-%, like 12 to 25 mol.-%, still more preferably in the range of 14 to 25 mol.-%.

The heterophasic propylene copolymer (HECO) has a xylene cold soluble (XCS) fraction (25° C.) in the range of 25 to 38 wt.-%, preferably in the range of 27 to 35 wt.-%, more preferably in the range of 30 to 34 wt.-%.

The comonomer content, preferably the content of ethylene and/or C₄ to C₁₂ α-olefin, more preferably the content of ethylene, of the xylene cold soluble fraction (XCS) of the heterophasic propylene copolymer (HECO) is in the range of 30.0 to 65.0 mol.-%, preferably in the range of 35.0 to 60.0 mol.-%, more preferably in the range of 40.0 to 55.0 mol.-%, still more preferably in the range of 45.0 to 55.0 mol.-%, yet more preferably in the range of 47.0 to 53.0 mol.-%.

Accordingly it is preferred that the heterophasic propylene copolymer (HECO) complies with the in-equation (1), more preferably with in-equation (1a), still more preferably with in-equation (1b), yet more preferably with in-equation (1c), $$\frac{C2(XCS)}{C2(T)} \leq 3.2 \tag{1}$$

$$1.8 \leq \frac{C2(XCS)}{C2(T)} \leq 3.1 \tag{1a}$$

$$2.0 \leq \frac{C2(XCS)}{C2(T)} \leq 3.0 \tag{1b}$$

$$2.2 \leq \frac{C2(XCS)}{C2(T)} \leq 2.9 \tag{1c}$$

wherein
C2 (XCS) is the comonomer content, preferably the content of ethylene and/or C₄ to C₁₂ α-olefin, more preferably the content of ethylene, of the xylene cold soluble (XCS) fraction [in mol % of the xylene cold soluble (XCS) fraction];

C2 (T) is the comonomer content, preferably the content of ethylene and/or $C_4$ to $C_{12}$ α-olefin, more preferably the content of ethylene, of heterophasic propylene copolymer (HECO) [in mol % of the heterophasic propylene copolymer (HECO)].

The intrinsic viscosity (IV) of the xylene cold soluble fraction (XCS) of the heterophasic propylene copolymer (HECO) is in the range of 1.70 to 2.30 dl/g, preferably in the range 1.80 to 2.20 dl/g, more preferably in the range of 1.90 to 2.18 dl/g.

Further it is preferred that the xylene insoluble fraction (XCI) of the heterophasic propylene copolymer (HECO) has an intrinsic viscosity (IV) in the range of 1.15 to 1.35 dug, more preferably in the range of 1.18 to 1.32 dl/g, still more preferably in the range of 1.19 to 1.31 dug.

Accordingly it is especially preferred that the heterophasic propylene copolymer (HECO) complies with the in-equation (2), more preferably with in-equation (2a), still more preferably with in-equation (2b), yet more preferably with in-equation (2c), $$1.00 \le \frac{IV(XCS)}{IV(XCI)} \le 2.00 \quad (2)$$

$$1.20 \le \frac{IV(XCS)}{IV(XCI)} \le 1.90 \quad (2a)$$

$$1.30 \le \frac{IV(XCS)}{IV(XCI)} \le 1.85 \quad (2b)$$

$$1.40 \le \frac{IV(XCS)}{IV(XCI)} \le 1.80 \quad (2c)$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

The (semi)crystalline polypropylene (PP) is preferably a (semi)crystalline random propylene copolymer (R-PP) or a (semi)crystalline propylene homopolymer (H-PP), the latter especially preferred.

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

In case the (semi)crystalline polypropylene (PP) is a (semi)crystalline random propylene copolymer (R-PP) it is appreciated that the (semi)crystalline random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP) according to this invention comprises, especially consists of, monomers co-polymerizable with propylene from the group consisting of ethylene, 1-butene and 1-hexene. More specifically the (semi)crystalline random propylene copolymer (R-PP) of this invention comprises—apart from propylene—units derivable from ethylene and/or 1-butene.

In a preferred embodiment the (semi)crystalline random propylene copolymer (R-PP) comprises units derivable from ethylene and propylene only.

Additionally it is appreciated that the (semi)crystalline random propylene copolymer (R-PP) has preferably a co-monomer content in the range of more than 0.30 to 3.0 mol-%, more preferably in the range of more than 0.35 to 2.5 mol-%, yet more preferably in the range of 0.40 to 2.0 mol-%.

The term "random" indicates in the present invention that the co-monomers of the (semi)crystalline random propylene copolymers are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semi)crystalline polypropylene (PP) and the elastomeric propylene copolymer (EC). However, it is preferred that the heterophasic propylene copolymer (HECO) is produced in a sequential step process, using reactors in serial configuration and operating at different reaction conditions. Typically the (semi)crystalline polypropylene (PP) is produced in a first reactor system comprising at least one reactor and subsequently the elastomeric propylene copolymer (EC) in a second reactor system comprising at least one reactor.

According to this invention the (semi)crystalline polypropylene (PP), like (semi)crystalline propylene homopolymer (H-PP), has a melt flow rate $MFR_2$ (230° C.) measured according to ISO 1133 of 42 to 75 g/10 min, more preferably of 45 to 70 g/10 min, still more preferably of 45 to 65 g/10 min.

Accordingly it is preferred that the heterophasic propylene copolymer (HECO) complies with the in-equation (3), more preferably with in-equation (3a), still more preferably with in-equation (3b), yet more preferably with in-equation (3c), $$\frac{MFR(M)}{MFR(T)} \le 4.0 \quad (3)$$

$$1.0 \le \frac{MFR(M)}{MFR(T)} \le 3.8 \quad (3a)$$

$$1.5 \le \frac{MFR(M)}{MFR(T)} \le 3.5 \quad (3b)$$

$$1.8 \le \frac{MFR(M)}{MFR(T)} 3.0 \quad (3c)$$

wherein
MFR (M) is the melt flow rate $MFR_2$ (230° C.) measured according to ISO 1133 (g/10 min) of the (semi)crystalline polypropylene (PP);
MFR (T) is the melt flow rate $MFR_2$ (230° C.) measured according to ISO 1133 (g/10 min) of the heterophasic propylene copolymer (HECO).

The term "(semi)crystalline" indicates in the present invention that the polymer is not amorphous. Accordingly it is preferred that the (semi)crystalline polypropylene (PP) according to this invention has a xylene soluble fraction (XCS) of not more than 10 wt.-%, in case of a (semi)crystalline propylene homopolymer (H-PP) the xylene soluble fraction (XCS) is even lower, i.e. not more than 6.0 wt, more preferably not more than 4.5 wt.-%, like not more than 3.5 wt.-%.

Accordingly it is preferred that the (semi)crystalline propylene homopolymer (H-PP) has a xylene soluble fraction (XCS) of below 5.0 wt.-%, more preferably in the range of 0.5 to 4.5, like in the range of 1.0 to 3.8 wt.-%.

The second component of the heterophasic propylene copolymer (HECO) is the elastomeric propylene copolymer (ESC).

Preferably said elastomeric propylene copolymer (EC) comprises units derived from
propylene and
ethylene and/or $C_4$ to $C_{12}$ α-olefin.

The elastomeric propylene copolymer (ESC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (ESC) may additionally contain units derived from a conjugated diene, like butadiene, or a non-conjugated diene, however it is preferred that the elastomeric propylene copolymer (ESC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1, 4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly the elastomeric propylene copolymer (ESC) comprises at least units derivable from propylene and ethylene and may comprise other units derivable from a further α-olefin as defined in the previous paragraph. However, it is in particular preferred that elastomeric propylene copolymer (ESC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (ESC) is especially preferred, the latter most preferred.

Accordingly in one preferred embodiment the heterophasic propylene copolymer (HECO) comprising
(a) a (semi)crystalline polypropylene (PP), preferably being a (semi)crystalline propylene homopolymer (H-PP), having a melt flow rate $MFR_2$ (230° C.) measured according to ISO 1133 in the range of 42 to 75 g/10 min, preferably in the range of 45 to 70 g/10 min, like in the range of 45 to 65 g/10 min;
(b) an elastomeric propylene copolymer (ESC) dispersed in said (semi)crystalline polypropylene (PP), said elastomeric propylene copolymer (ESC) is preferably an ethylene propylene rubber (EPR); and
wherein said heterophasic propylene copolymer (HECO)
(i) has a xylene cold soluble (XCS) fraction in the range of 27 to 35 wt.-%, like in the range of 30 to 34 wt.-%, said xylene cold soluble (XCS) has a comonomer content, preferably ethylene content, in the range of 30.0 to 65.0 mol-%, preferably in the range of 35.0 to 60.0 mol-%, more preferably in the range of 40.0 to 55.0 mol-%, still more preferably in the range of 45.0 to 55.0 mol-%, like in the range of 47.0 to 53.0 mol-%, and an intrinsic viscosity (IV) in the range of 1.90 to 2.18 dl/g;
(ii) has melt flow rate $MFR_2$ (230° C.) measured according to ISO 1133 in the range of 18 to 35 g/10 min, more preferably in the range of 20 to 30 g/10 min;
(iii) complies with the in-equation (2)

$$1.40 \leq \frac{IV(XCS)}{IV(XCI)} \leq 1.80 \qquad (2)$$

wherein
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

Preferably the heterophasic propylene copolymer (HECO) according to the previous paragraph
(a) complies with the in-equation (3), preferably with in-equation (3a), more preferably with in-equation (3b), yet more preferably with in-equation (3c), $$\frac{MFR(M)}{MFR(T)} \leq 4.0 \qquad (3)$$

$$1.0 \leq \frac{MFR(M)}{MFR(T)} \leq 3.8 \qquad (3a)$$

$$1.5 \leq \frac{MFR(M)}{MFR(T)} \leq 3.5 \qquad (3b)$$

$$1.8 \leq \frac{MFR(M)}{MFR(T)} 3.0 \qquad (3c)$$

wherein
MFR (M) is the melt flow rate $MFR_2$ (230° C.) measured according to ISO 1133 (g/10 min) of the (semi)crystalline polypropylene (PP);
MFR (T) is the melt flow rate $MFR_2$ (230° C.) measured according to ISO 1133 (g/10 min) of the heterophasic propylene copolymer (HECO);
and/or
(b) has a comonomer content in the range of 8.5 to 25 mol-%;
and/or
(c) wherein the intrinsic viscosity (IV) of the xylene cold insoluble (XCI) fraction of the heterophasic propylene copolymer (HECO) is in the range of 1.15 to 1.35 dl/g, preferably in the range of 1.18 to 1.32 dl/, like in the range of 1.19 to 1.31.

As mentioned above the heterophasic propylene copolymer (HECO) can be produced by blending the (semi)crystalline polypropylene (PP) and the elastomeric propylene copolymer (ESC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution.

The heterophasic propylene copolymer (HECO) according to this invention is preferably produced in a sequential polymerization process, i.e. in a multistage process, known in the art, wherein the (semi)crystalline polypropylene (PP) is produced at least in one slurry reactor, preferably in a slurry reactor and optionally in a subsequent gas phase reactor, and subsequently the elastomeric propylene copolymer (ESC) is produced at least in one, i.e. one or two, gas phase reactor(s).

Accordingly the heterophasic propylene copolymer (HECO) is obtained by producing the (semi)crystalline polypropylene (PP) in a first reaction zone comprising at least one reactor. Transferring said (semi)crystalline polypropylene (PP) in a subsequent reaction zone comprising at least one reactor where in the presence of the (semi)crystalline polypropylene (PP) the elastomeric propylene copolymer (ESC) is produced.

Accordingly it is preferred that the heterophasic propylene copolymer (HECO) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semi) crystalline polypropylene (PP), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (PP), i.e. the matrix of the heterophasic propylene copolymer (HECO),
(d) transferring the (semi)crystalline polypropylene (PP) of step (c) into a third reactor (R3),
(e) polymerizing in the third reactor (R3) and in the presence of the (semi)crystalline polypropylene (PP) obtained in step (c) propylene and at least one ethylene and/or $C_4$ to $C_{12}$ α-olefin obtaining thereby the first elastomeric fraction of the elastomeric propylene copolymer (ESC),
(f) transferring the (semi)crystalline polypropylene (PP) and the first elastomeric fraction of the elastomeric propylene copolymer (ESC) of step (e) into a fourth reactor (R4),
(g) polymerizing in the fourth reactor (R4) and in the presence of the (semi)crystalline polypropylene (PP) and the first elastomeric fraction a second fraction of the elastomeric propylene copolymer (ESC) obtaining thereby the elastomeric propylene copolymer (ESC) being dispersed in the (semi)crystalline polypropylene (PP), i.e. obtaining thereby the heterophasic propylene copolymer (HECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

The term "sequential polymerization process" indicates that the heterophasic propylene copolymer (HECO) is produced in at least two, like three or four reactors connected in series. Accordingly the present process comprises at least a first reactor (R1) and a second reactor (R2), more preferably a first reactor (R1), a second reactor (R2) and a third reactor (R3) or a first reactor (R1), a second reactor (R2), a third reactor (R3) and fourth reactor (R4). The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and fourth reactor (R4) are preferably gas phase reactors (GPR).

Such gas phase reactors (GPR) can be any mechanically mixed or fluid bed reactors.

Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic propylene copolymer (HECO) is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

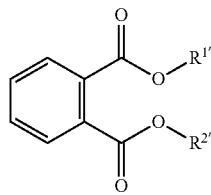

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or
d) optionally reacting the product of step c) with additional $TiCl_4$ The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of
adding to said titanised carrier
  (i) a dialkylphthalate of formula (I) with $R^{1'}$ and $R^{2'}$ being independently at least a $C_5$-alkyl, like at least a $C_8$-alkyl,
or preferably
  (ii) a dialkylphthalate of formula (I) with $R^{1'}$ and $R^{2'}$ being the same and being at least a $C_5$-alkyl, like at least a $C_8$-alkyl,
or more preferably
  (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

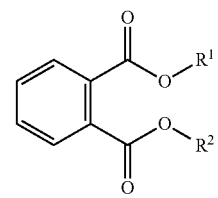

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

Si(OCH$_3$)$_2$R$_2^5$                        (IIIa)

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

Si(OCH$_2$CH$_3$)$_3$(NR$^x$R$^y$)                        (IIIb)

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor is of formula (IIIa), like dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$].

Most preferably the external donor is dicyclopentyl dimethoxy silane [Si(OCH$_3$)$_2$(cyclo-pentyl)$_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

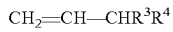

CH$_2$=CH—CHR$^3$R$^4$ wherein R$^3$ and R$^4$ together form a 5- or 6-membered saturated, unsaturated or aromatic ring or independently represent an alkyl group comprising 1 to 4 carbon atoms, and the modified catalyst is used for the preparation of heterophasic propylene copolymer (HECO) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Polyolefin Composition (PO)

The present invention is further directed to a polyolefin composition (PO) comprising at least 65 wt.-%, based on the total weight of the polyolefin composition (PO), of the heterophasic propylene copolymer (HECO) as defined above. Additionally the polyolefin composition preferably comprises a high density polyethylene (HDPE) with a density in the range of 950 to 970 kg/m$^3$ and/or inorganic filler (F).

In addition the polyolefin composition (PO) may comprise alpha-nucleating agents (NU) and/or additives (AD). According to this invention, neither the alpha nucleating agent (NU) nor the filler (F) is an additive (AD). Further, according to this invention the filler (F) is not an alpha nucleating agent (NU). Accordingly it is preferred that the composition contains up to 5.0 wt.-%, preferably 1.0×10$^{-5}$ to 4.0 wt.-%, more preferably 2.0×10$^{-5}$ to 2.0 wt.-%, based on the total weight of the polyolefin composition (PO), of alpha nucleating agents (NU) and/or up to 8.0 wt.-%, preferably 0.1 to 6.0 wt.-%, more preferably 0.5 to 4.0 wt.-%, based on the total weight of the polyolefin composition (PO), of additives (AD).

Accordingly the present invention preferably is directed to a polyolefin composition (PO) comprising (a) at least 65 wt.-%, more preferably 70 to 98 wt.-%, still more preferably 75 to 95 wt.-%, based on the total weight of the polyolefin composition (PO), of the heterophasic propylene copolymer (HECO) as defined herein;

and as further component(s)

(b1) at least 2 wt.-%, more preferably 2 to 15 wt.-%, still more preferably 4 to 12 wt.-%, based on the total weight of the polyolefin composition (PO), of the high density polyethylene (HDPE) having a density in the range of 950 to 970 kg/m$^3$;

and/or (b2) at least 5 wt.-%, more preferably 5 to 20 wt.-%, still more preferably 8 to 15 wt.-%, based on the total weight of the polyolefin composition (PO), of an inorganic filler (F).

Thus in a first embodiment the polyolefin composition (PO) comprises the heterophasic propylene copolymer (HECO) as defined herein and the high density polyethylene (HDPE) as defined herein. Preferably the weight ratio between the heterophasic propylene copolymer (HECO) and the high density polyethylene (HDPE) [(HECO)/(HDPE)] is in the range of 5/1 to 25/1, more preferably in the range of 7/1 to 20/1. Preferably according to the first embodiment of the polyolefin composition (PO), the polyolefin composition (PO) does not contain inorganic filler (F).

Thus it is preferred that the first embodiment of the polyolefin composition (PO) comprises
(a) at least 75 wt.-%, more preferably 75 to 99 wt.-%, still more preferably 80 to 98 wt.-%, yet more preferably 85 to 97 wt.-%, based on the total weight of the polyolefin composition (PO), of the heterophasic propylene copolymer (HECO) as defined herein; and
(b) at least 2 wt.-%, more preferably 2 to 25 wt.-%, still more preferably 3 to 20 wt.-%, yet more preferably 4 to 15 wt.-%, based on the total weight of the polyolefin composition (PO), of the high density polyethylene (HDPE) as defined herein.

In a very specific first embodiment, the polyolefin composition (PO) consists of
(a) at least 75 wt.-%, more preferably 75 to 99 wt.-%, still more preferably 80 to 98 wt.-%, yet more preferably 85 to 97 wt.-%, based on the total weight of the polyolefin composition (PO), of the heterophasic propylene copolymer (HECO) as defined herein;
(b) at least 2 wt.-%, more preferably 2 to 25 wt.-%, still more preferably 3 to 20 wt.-%, yet more preferably 4 to 15 wt.-%, based on the total weight of the polyolefin composition (PO), of the high density polyethylene (HDPE) as defined herein;
(c) optionally up to 5.0 wt.-%, preferably $1.0 \times 10^{-5}$ to 4.0 wt.-%, more preferably $2.0 \times 10^{-5}$ to 2.0 wt.-%, based on the total weight of the polyolefin composition (PO), of alpha nucleating agents (NU); and
(d) optionally up to 8.0 wt.-%, preferably 0.1 to 6.0 wt.-%, more preferably 0.5 to 4.0 wt.-%, based on the total weight of the polyolefin composition (PO), of additives (AD).

In a second embodiment the polyolefin composition (PO) comprises the heterophasic propylene copolymer (HECO) as defined herein and the inorganic filler (F) as defined herein. Preferably the weight ratio between the heterophasic propylene copolymer (HECO) and the inorganic filler (F) [(HECO)/(F)] is in the range of 3/1 to 20/1, more preferably in the range of 5/1 to 15/1. Preferably according to the second embodiment of the polyolefin composition (PO), the polyolefin composition (PO) does not contain a high density polyethylene (HDPE) having a density in the range of in the range of 950 to 970 kg/m³.

Thus it is preferred that the second embodiment of the polyolefin composition (PO) comprises
(a) at least 75 wt.-%, more preferably 75 to 99 wt.-%, still more preferably 80 to 98 wt.-%, yet more preferably 85 to 97 wt.-%, based on the total weight of the polyolefin composition (PO), of the heterophasic propylene copolymer (HECO) as defined herein; and
(b) at least 5 wt.-%, more preferably 5 to 25 wt.-%, still more preferably 7 to 20 wt.-%, yet more preferably 8 to 15 wt.-%, based on the total weight of the polyolefin composition (PO), of the inorganic filler (F) as defined herein.

In a very specific second embodiment, the polyolefin composition (PO) consists of
(a) at least 75 wt.-%, more preferably 75 to 99 wt.-%, still more preferably 80 to 98 wt.-%, yet more preferably 85 to 97 wt.-%, based on the total weight of the polyolefin composition (PO), of the heterophasic propylene copolymer (HECO) as defined herein;
(b) at least 5 wt.-%, more preferably 5 to 25 wt.-%, still more preferably 7 to 15 wt.-%, yet more preferably 8 to 12 wt.-%, based on the total weight of the polyolefin composition (PO), of the inorganic filler (F) as defined herein;
(c) optionally up to 5.0 wt.-%, preferably $1.0 \times 10^{-5}$ to 4.0 wt.-%, more preferably $2.0 \times 10^{-5}$ to 2.0 wt.-%, based on the total weight of the polyolefin composition (PO), of alpha nucleating agents (NU); and
(d) optionally up to 8.0 wt.-%, preferably 0.1 to 6.0 wt.-%, more preferably 0.5 to 4.0 wt.-%, based on the total weight of the polyolefin composition (PO), of additives (AD).

In a third embodiment the polyolefin composition (PO) comprises the heterophasic propylene copolymer (HECO) as defined herein, the high density polyethylene (HDPE) as defined herein and the inorganic filler (F) as defined herein. Preferably the weight ratio between the inorganic filler (F) and the high density polyethylene (HDPE) [(F)/(HDPE)] is at least 0.6, more preferably in the range of 2/3 to 2/1, yet more preferably in the range of 4/5 to 3/2. Further it is preferred that the weight ratio between the heterophasic propylene copolymer (HECO) and the inorganic filler (F) [(HECO)/(HDPE)] is in the range of 3/1 to 20/1, more preferably in the range of 5/1 to 15/1.

Thus it is preferred that the third embodiment of the polyolefin composition (PO) comprises
(a) at least 65 wt.-%, more preferably 65 to 95 wt.-%, still more preferably 70 to 90 wt.-%, yet more preferably 75 to 85 wt.-%, based on the total weight of the polyolefin composition (PO), of the heterophasic propylene copolymer (HECO) as defined herein;
(b) at least 2 wt.-%, more preferably 2 to 25 wt.-%, still more preferably 3 to 20 wt.-%, yet more preferably 4 to 15 wt.-%, based on the total weight of the polyolefin composition (PO), of the high density polyethylene (HDPE) as defined herein; and
(c) at least 5 wt.-%, more preferably 5 to 25 wt.-%, still more preferably 7 to 20 wt.-%, yet more preferably 8 to 15 wt.-%, based on the total weight of the polyolefin composition (PO), of the inorganic filler (F) as defined herein.

In a very specific third embodiment, the polyolefin composition (PO) consists of
(a) at least 65 wt.-%, more preferably 65 to 95 wt.-%, still more preferably 70 to 90 wt.-%, yet more preferably 75 to 85 wt.-%, based on the total weight of the polyolefin composition (PO), of the heterophasic propylene copolymer (HECO) as defined herein;
(b) at least 2 wt.-%, more preferably 2 to 25 wt.-%, still more preferably 3 to 20 wt.-%, yet more preferably 4 to 15 wt.-%, based on the total weight of the polyolefin composition (PO), of the high density polyethylene (HDPE) as defined herein; and
(c) at least 5 wt.-%, more preferably 5 to 25 wt.-%, still more preferably 7 to 20 wt.-%, yet more preferably 8 to 15 wt.-%, based on the total weight of the polyolefin composition (PO), of the inorganic filler (F) as defined herein;
(d) $10^{-5}$ to 2.0 wt.-%, based on the total weight of the polyolefin composition (PO), of alpha nucleating agents (NU); and
(e) optionally up to 8.0 wt.-%, preferably 0.1 to 6.0 wt.-%, more preferably 0.5 to 4.0 wt.-%, based on the total weight of the polyolefin composition (PO), of additives (AD).

In the following the three embodiments of the polyolefin composition (PO) will be discussed together.

Preferably the polyolefin composition (PO) has a melt flow rate $MFR_2$ (230° C.) measured according to ISO 1133 in the range of 15 to 40 g/10 min, more preferably in the range of 17 to 35 g/10 min, still more preferably in the range of 18 to 30 g/10 min.

It is preferred that the weight ratio between the between the xylene cold soluble (XCS) fraction of the heterophasic propylene copolymer (HECO) and the high density polyethylene (HDPE) [(XCS)/(HDPE)] is above 2.0, more preferably in the range of above 2.0 to 5.0, still more preferably in the range of 2.3 to 4.2.

It is further preferred that the polyolefin composition (PO) as defined herein has
(a) tensile modulus of at least 1100 MPa, more preferably in the range of 1100 to 1700 MPa, still more preferably in the range of 1200 to 1600 MPa;
and/or
(b) impact strength at +23° C. of at least 20 $kJ/m^2$, more preferably in the range of 20 to 50 $kJ/m^2$, still more preferably in the range of 22 to 48 $kJ/m^2$;
and/or
(c) a coefficient of linear thermal expansion (CLTE) performed in a temperature range from −30 to +80° C. of not more than 80 μm/mK, more preferably in the range of 40 to 80 μm/mK, still more preferably in the range of 55 to 75 μm/mK.

The High Density Polyethylene (HDPE)

The high density polyethylene (HDPE)—if present in the polyolefin composition (PO)—has preferably a density of at least 950 $kg/m^3$, more preferably in the range of 950 to 970 $kg/m^3$, still more preferably in the range of 955 to 968 $kg/m^3$, like 958 to 968 $kg/m^3$.

Preferably the high density polyethylene (HDPE) has a melt flow rate $MFR_2$ (190° C.) in the range of 15 to 80 g/10 min, more preferably in the range of 20 to 50.0 g/10 min, like in the range of 20 to 40 g/l0 min.

The high density polyethylene (HDPE) is state of the art and a commercially available product, like for instance Stamylex 2H 280 of Borealis AG.

The Inorganic Filler (F)

As mentioned above the polyolefin composition (PO) according to this invention may comprise inorganic filler (F). Thus, the filler (F) is not regarded as being encompassed by the additives (AD) defined in more detail below.

Preferably inorganic filler (F) is mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size ($D_{50}$) in the range of 0.8 to 20 μm and/or a top cut particle size ($D_{95}$) in the range of 3.0 to 20 μm, preferably a median particle size ($D_{50}$) in the range of 1.0 to 7.0 μm and/or top cut particle size ($D_{95}$) in the range of 2.0 to 17 μm, more preferably a median particle size ($D_{50}$) in the range of 1.0 to 5.0 μm and/or top cut particle size ($D_{95}$) of 2.5 to 11.5 μm.

According to this invention the filler (F) does not belong to the class of alpha nucleating agents (NU) and additives (AD).

The filler (F) is state of the art and a commercially available product.

The Alpha Nucleating Agents (NU)

In one embodiment of the invention the polyolefin composition (PO) comprises alpha-nucleating agent, more preferably the composition is free of beta-nucleating agent.

According to this invention the alpha nucleating agent (NU) is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer or vinylalkane polymer, and
(v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the polyolefin composition (PO) is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer (HECO) present in the inventive polyolefine composition (PO). The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition to the heterophasic propylene copolymer (HECO), the high density polyethylene (HDPE) and the inorganic filler (F) the polyolefin composition (PO) may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the polyolefin composition (PO) of the invention does not comprise (a) further polymer (s) different to the heterophasic propylene copolymer (HECO) and the high density polyethylene (HDPE) in an amount exceeding 10 wt.-%, preferably in an amount exceeding 5 wt.-%, more preferably in an amount exceeding 3 wt.-%, based on the weight of the composition. If an additional polymer is present, such a polymer is typically a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the composition of the invention. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The heterophasic propylene copolymer (HECO) or the polyolefin composition (PO) of the present invention is preferably used for the production of articles, more preferably of moulded articles, yet more preferably of injection moulded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive heterophasic propylene copolymer (HECO) or the inventive polyolefin composition (PO). Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive heterophasic propylene copolymer (HECO) or the inventive polyolefin composition (PO).

The invention will be further defined by way of examples.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C$ {$^{1}H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C$ {$^{1}H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%] = 100 * fE$$

The weight percent comonomer incorporation was calculated from the mole fraction:

$$E[\text{wt }\%] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

$MFR_2$ (230° C.) is measured according to ISO 1133 (230° C., 2.16 kg load).

$MFR_2$ (190° C.) is measured according to ISO 1133 (190° C., 2.16 kg load).

Density is measured according to ISO 1183-1—method A (2004). Sample preparation is done by compression moulding in accordance with ISO 1872-2:2007.

Xylene cold soluble fraction (XCS wt.-%): Content of xylene cold solubles (XCS) is determined at 25° C. according ISO 16152; first edition; 2005-07-01. The part which remains insoluble is the xylene cold insoluble (XCI) fraction.

Intrinsic viscosity is measured according to DIN ISO 1628/1, October 1999 (in Decalin at 135° C.).

The tensile modulus and tensile strain at break were measured according to ISO 527-2 (cross head speed=1 mm/min; 23° C.) using injection molded specimens as described in EN ISO 1873-2 (dog bone shape, 4 mm thickness). The measurement is done after 96 h conditioning time of the specimen.

Charpy notched impact strength is determined according to ISO 180/1A at 23° C. and −20° C. by using injection moulded test specimens as described in EN ISO 1873-2 (80×10×4 mm).

Median particle size ($D_{50}$) (Sedimentation) is calculated from the particle size distribution [mass percent] as determined by gravitational liquid sedimentation according to ISO 13317-3 (Sedigraph)

Cutoff particle size ($D_95$) (Sedimentation) is calculated from the particle size distribution [mass percent] as determined by gravitational liquid sedimentation according to ISO 13317-3 (Sedigraph)

Coefficient of linear thermal expansion: The coefficient of linear thermal expansion (CLTE) was determined in accordance with ISO 11359-2:1999 on 10 mm long pieces cut from the same injection molded specimens as used for the tensile modulus determination. The measurement was performed in a temperature range from −30 to +80° C. at a heating rate of 1° C./min and a temperature range from 23 to +80° C. at a heating rate of 1° C./min in machine direction, respectively.

Shrinkage (SH) radial and Shrinkage (SH) tangential were determined on centre gated, injection moulded circular disks (diameter 180 mm, thickness mm, having a flow angle of 355° and a cut out of 5°). Two specimens 180×2 mm are moulded applying holding pressure between 590 to 640 bar. The melt temperature at the gate is 260° C., and the average flow front velocity in the mould 100 mm/s. Tool temperature: 40° C., back pressure: 600 bar.

Preparation of HECOs 1 to 4

Catalyst for HECO1, HECO2 and HECO4

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 0 491 566, EP 0 591 224 and EP 0 586 390.

The catalyst was further modified (VCH modification of the catalyst). 35 ml of mineral oil (Paraffinum Liquidum PL68) was added to a 125 ml stainless steel reactor followed by triethyl aluminium (TEAL) and dicyclopentyl dimethoxy silane (donor D) for HECO1 and HECO2 and by triethyl aluminium (TEAL) and diethylaminotriethoxysilane (U-donor) for HECO4, respectively, under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

Catalyst for HECO3

80 mg of ZN104-catalyst of LyondellBasell is activated for 5 minutes with a mixture of Triethylaluminium (TEAL; solution in hexane 1 mol/l) and Dicyclopentyldimethoxysilane as donor (0.3 mol/l in hexane)—in a molar ratio of 18.7 (Co/ED) after a contact time of 5 min- and 10 ml hexane in a catalyst feeder. The molar ratio of TEAL and Ti of catalyst is 220 (Co/TC)). After activation the catalyst is spilled with 250 g propylene into the stirred reactor with a temperature of 23° C. Stirring speed is hold at 250 rpm. After 6 min prepolymersation at 23° C. the polymerisation starts as indicated in table 1.

TABLE 1

Polymerization of HECOs 1 to 4

|  |  | HECO1 IE1 | HECO2 IE2 | HECO3 CE1 | HECO4 CE2 |
|---|---|---|---|---|---|
| Prepoly |  |  |  |  |  |
| Residence time | [h] | 0.25 | 0.29 | 0.27 | 0.25 |
| Temperature | [° C.] | 27 | 28 | 28 | 30 |
| Co/ED ratio | [mol/mol] | 5.94 | 5.90 | 5.90 | 5.1 |
| Co/TC ratio | [mol/mol] | 184 | 229 | 395 | 190 |

TABLE 1-continued

Polymerization of HECOs 1 to 4

|  |  | HECO1 IE1 | HECO2 IE2 | HECO3 CE1 | HECO4 CE2 |
|---|---|---|---|---|---|
| Loop (R1) | | | | | |
| Residence time | [h] | 0.26 | 0.41 | 0.29 | 0.22 |
| Temperature | [° C.] | 61 | 62 | 61 | 72 |
| $H_2/C_3$ ratio | [mol/kmol] | 13.9 | 10.6 | 4.06 | 26.9 |
| MFR | [g/10 min] | 63 | 50 | 43 | 294 |
| XCS | [wt %] | 3.3 | 2.3 | 3.2 | 3.4 |
| C2 content | [mol %] | 0 | 0 | 0 | 0 |
| 1st GPR (R2) | | | | | |
| Residence time | [h] | 0.09 | 0.10 | 0.28 | 0.34 |
| Temperature | [° C.] | 79 | 80 | 80 | 87 |
| Pressure | [kPa] | 15 | 15 | 14 | 22 |
| $H_2/C_3$ ratio | [mol/kmol] | 161 | 151 | 28 | 21 |
| MFR | [g/10 min] | 63 | 48 | 36 | 230 |
| XCS | [wt %] | 3.4 | 1.8 | 3.1 | 3.1 |
| C2 content | [mol %] | 0 | 0 | 0 | 0 |
| 2nd GPR (R3) | | | | | |
| Residence time | [h] | 0.12 | 0.19 | 0.60 | 0.13 |
| Temperature | [° C.] | 60 | 60 | 59 | 82 |
| Pressure | [kPa] | 13 | 14 | 14 | 22 |
| $C_2/C_3$ ratio | [mol/kmol] | 548 | 550 | 546 | 305 |
| $H_2/C_2$ ratio | [mol/kmol] | 472 | 508 | 487 | 22 |
| MFR | [g/10 min] | 33 | 25 | 18 | 67 |
| XCS | [wt %] | 22 | 24 | 22.5 | 21.6 |
| C2 content | [mol %] | 12.6 | 15.6 | 0 | 13.9 |
| 3rd GPR (R4) | | | | | |
| Residence time | [h] | 0.12 | 0.32 | 0.48 | 0.58 |
| Temperature | [° C.] | 80 | 80 | 80 | 85 |
| Pressure | [kPa] | 1500 | 1500 | 15 | 2600 22 |
| $C_2/C_3$ ratio | [mol/kmol] | 549 | 551 | 550 | 305 |
| $H_2/C_2$ ratio | [mol/kmol] | 391 | 508 | 485 | 71.8 |
| $MFR_2$ | [g/10 min] | 23 | 21 | 13 | 35 |
| Split (R1 + 2/R3 + 4) | [—] | 66.1/33.9 | 64.5/35.5 | 69/31 | 72.4/27.6 |
| XCS | [wt %] | 32.8 | 32.7 | 30.9 | 31 |
| IV of XCI | [dl/g] | 1.22 | 1.28 | 1.36 | 0.91 |
| IV of XCS | [dl/g] | 2.12 | 2.02 | 2.3 | 2.7 |
| C2 of XCS | [mol %] | 49.0 | 50.3 | 56.1 | 47.4 |
| C2 content | [mol %] | 20.9 | 20.0 | 22.2 | 19.2 |

The HECOs 1 to 4 have been produced in a Borstar pilot plant.

The HECOs 1 to 4 were mixed in a twin-screw extruder with 0.2 wt % of Songnox 11B FF which is is a blend of SONGNOX' 1010, a primary high molecular weight hindered phenolic antioxidant, with SONGNOX$^B$ 1680, a secondary phosphite antioxidant supplied by BASF AG, and 0.05 wt % Calcium stearate (CAS-no. 1592-23-0) supplied by Croda Polymer Additives.

The inventive and comparative compositions were melt blended on a co-rotating twin screw extruder.

TABLE 2

Properties of the examples

|  | Units | IE1 | IE2 | CE1 | CE2 | IE3 | IE4 | IE5 | CE3 |
|---|---|---|---|---|---|---|---|---|---|
| HECO1 | [wt.-%] | 100 | — | — | — | 95 | 90 | — | — |
| HECO2 | [wt.-%] | — | 100 | — | — | — | — | 95 | — |
| HECO3 | [wt.-%] | — | — | 100 | — | — | — | — | — |
| HECO4 | [wt.-%] | — | — | — | 100 | — | — | — | 84 |
| HDPE1 | [wt.-%] | — | — | — | — | 5 | 10 | 5 | — |
| HDPE2 | [wt.-%] | — | — | — | — | — | — | — | 16 |
| MFR | [g/10 min] | 22 | 20 | 12 | 35 | 23 | 21 | 19 | 32 |
| SHr | [%] | 1.36 | 1.16 | 1.26 | nm | 1.16 | 1.13 | 1.14 | 1.50 |
| SHt | [%] | 1.28 | 1.11 | 1.17 | nm | 1.12 | 1.08 | 1.15 | 1.40 |
| TM | [MPa] | 983 | 984 | 900 | 1197 | 974 | 973 | 954 | 1076 |
| TS | [%] | 117 | 378 | 400 | 17 | 385 | 398 | 373 | 22 |
| CHI(23) | [kJ/m²] | 28.5 | 42 | 33 | 13 | 39 | 37 | 45 | 14 |
| CHI(−20) | [kJ/m²] | 7 | 8 | 7 | 6 | 7 | 5 | 6 | 6 |
| CLTE 23/80° C. | [µm/mK] | 121 | 109 | 110 | — | 100 | 92 | 96 | 109 |
| CLTE −30/80° C. | [µm/mK] | 106 | 97 | 95 | 110 | 89 | 84 | 87 | 96 |

TABLE 3

Properties of the examples

|  | Units | IE6 | IE7 | IE8 | IE9 | CE4 | CE5 |
|---|---|---|---|---|---|---|---|
| HECO1 | [wt.-%] | 89.75 | 79.75 | — | — | — | — |
| HECO2 | [wt.-%] | — | — | 90 | 83 | — | — |
| HECO3 | [wt.-%] | — | — | — | — | — | — |
| HECO4 | [wt.-%] | — | — | — | — | 69 | 75.5 |
| HECO5 | [wt.-%] | — | — | — | — | 7 | — |
| HDPE1 | [wt.-%] | — | 10 | — | 7 | — | — |
| HDPE2 | [wt.-%] | — | — | — | — | 14 | 14.5 |
| Talc1 | [wt.-%] | 10 | 10 | — | — | — | — |
| Talc2 | [wt.-%] | — | — | 10 | 10 | 7 | 7 |
| MFR | [g/10 min] | 24 | 21 | 21 | 21 | 24 | 29 |
| SHr | [%] | 0.97 | 0.93 | 0.98 | 0.94 | 1.26 | 1.28 |
| SHt | [%] | 0.87 | 0.88 | 0.95 | 0.90 | nm | nm |

TABLE 3-continued

Properties of the examples

| | Units | IE6 | IE7 | IE8 | IE9 | CE4 | CE5 |
|---|---|---|---|---|---|---|---|
| TM | [Mpa] | 1516 | 1410 | 1368 | 1283 | 1311 | 1327 |
| TS | [%] | 105 | 80 | 365 | 378 | 37 | 19 |
| CHI(23) | [kJ/m$^2$] | 30 | 45 | 23 | 37 | 45 | 10 |
| CHI(−20) | [kJ/m$^2$] | 5 | 7 | 5 | 5 | 6 | 2.3 |
| CLTE23 | [μm/mK] | 70 | 64 | 73 | 71 | nm | nm |
| CLTE −30 | [μm/mK] | 63 | 60 | 68 | 65 | 83 | 84 | nm not measured
SHr shrinkage (SH) radial
SHt shrinkage (SH) tangential
TM Tensile Modulus
TS Tensile Strain at break
CHI(23) Charpy impact strength at 23° C.
CHI(−20) Charpy impact strength at −20° C.
CLTE23 CLTE +23/80° C./MD
CLTE-30 CLTE −30/80° C./MD HDPE1 is the commercial high density polyethylene Stamylex 2H 280 of Borealis AG having a MFR$_2$ (190° C./2.16 kg) of 25 g/10 min and a density of 966 kg/m$^3$.

HDPE2 is the commercial high density polyethylene MG 9601 of Borealis AG having a MFR$_2$ (190° C./2.16 kg) of 28 g/10 min and a density of 966 kg/m$^3$.

HECO 5 is the commercial heterophasic propylene copolymer of Borealis AG with the following properties:
MFR$_2$ (230° C.) of matrix: 8 g/10 min
MFR$_2$ (230° C.) total: 7 g/10 min
XCS: 23 wt.-%
C2 total: 11.5 mol %
C2 in XCS: 33.3 mol-%
IV of XCI: 1.9 dl/g
IV of XCS: 1.2 dl/g Talc 1 is the commercial talc is HAR T84 of Luzenac having median particle size (D$_{50}$) [mass percent] of 2 μm and, a cutoff particle size (D$_{95}$) [mass percent] of 10 μm (sedigraph).

Talc 2 is the commercial talc Jetfine 3CA of Luzenac having median particle size (D$_{50}$) [mass percent] of 1 μm and a cutoff particle size (D$_{95}$) [mass percent] of 3.3 μm (sedigraph).

The invention claimed is:

1. A polyolefin composition (PO) comprising:
(a) at least 65 wt. %, based on the total weight of the polyolefin composition (PO), of a heterophasic propylene copolymer (HECO) comprising:
(a) a (semi)crystalline polypropylene (PP) having a melt flow rate MFR$_2$ (230° C.) measured according to ISO 1133 in the range of 42 to 75 g/10 min; and
(b) an elastomeric propylene copolymer (ESC) dispersed in said (semi)crystalline polypropylene (PP);
(b1) 2 to 15 wt. %, based on the total weight of the polyolefin composition (PO), of a high density polyethylene (HDPE) having a density in the range of 950 to 970 kg/m$^3$; and/or
(b2) 5 to 20 wt. %, based on the total weight of the polyolefin composition (PO), of an inorganic filler (F);
wherein said heterophasic propylene copolymer (HECO) has:
(i) a xylene cold soluble (XCS) fraction in the range of 25 to 38 wt. %;
wherein further the xylene cold soluble (XCS) fraction of said heterophasic propylene copolymer (HECO) has:
(ii) a comonomer content in the range of 30.0 to 65.0 mol %; and
(iii) an intrinsic viscosity (IV) in the range of 1.70 to 2.30 dl/g.

2. A polyolefin composition (PO) according to claim 1, wherein the intrinsic viscosity (IV) of the xylene cold insoluble (XCI) fraction of the heterophasic propylene copolymer (HECO) is in the range of 1.15 to 1.35 dl/g.

3. A polyolefin composition (PO) comprising:
(a) at least 65 wt. %, based on the total weight of the polyolefin composition (PO), of a heterophasic propylene copolymer (HECO) comprising:
(a) a (semi)crystalline polypropylene (PP); and
(b) an elastomeric propylene copolymer (ESC) dispersed in said (semi)crystalline polypropylene (PP);
(b1) 2 to 15 wt. %, based on the total weight of the polyolefin composition (PO), of a high density polyethylene (HDPE) having a density in the range of 950 to 970 kg/m$^3$; and/or
(b2) 5 to 20 wt. %, based on the total weight of the polyolefin composition (PO), of an inorganic filler (F);
wherein said heterophasic propylene copolymer (HECO) has:
(i) a xylene cold soluble (XCS) fraction in the range of 25 to 38 wt. %;
wherein further the xylene cold soluble (XCS) fraction of said heterophasic propylene copolymer (HECO) has:
(ii) a comonomer content in the range of 30.0 to 65.0 mol %; and
(iii) an intrinsic viscosity (IV) in the range of 1.70 to 2.30 dl/g;
and wherein still further;
(iv) the xylene cold insoluble (XCI) fraction of the heterophasic propylene copolymer (HECO) has an intrinsic viscosity (IV) in the range of 1.15 to 1.35 dl/g.

4. A polyolefin composition (PO) according to claim 1, the heterophasic propylene copolymer (HECO) having:
(a) a melt flow rate MFR$_2$ (230° C.) measured according to ISO 1133 in the range of 18 to 40 g/10 min; and/or
(b) a comonomer content in the range of 8.5 to 25 mol %.

5. The polyolefin composition (PO) according to claim 1, the heterophasic propylene copolymer (HECO) complying with:
(a) the in-equation (3):

$$\frac{MFR(M)}{MFR(T)} \leq 4.0 \qquad (3)$$

wherein;
MFR (M) is the melt flow rate MFR$_2$ (230° C.) measured according to ISO 1133 (g/10 min) of the (semi)crystalline polypropylene (PP);
MFR (T) is the melt flow rate MFR$_2$ (230° C.) measured according to ISO 1133 (g/10 min) of the heterophasic propylene copolymer (HECO); and/or
(b) the in-equation (2):

$$1.00 \leq \frac{IV(XCS)}{IV(XCI)} \leq 2.00 \qquad (2)$$

wherein;
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

6. The polyolefin composition (PO) of according to claim 1, wherein said heterophasic propylene copolymer (HECO):
(i) has a xylene cold soluble (XCS) fraction in the range of 27 to 35 wt. %, having a comonomer content in the range of 30.0 to 65.0 mol-% and an intrinsic viscosity (IV) in the range of 1.90 to 2.18 dl/g;
(ii) has a melt flow rate MFR$_2$ (230° C.) measured according to ISO 1133 in the range of 18 to 35 g/10 min;
(iii) complies with the in-equation (2):

$$1.40 \leq \frac{IV(XCS)}{IV(XCI)} \leq 1.80 \qquad (2)$$

wherein;
IV (XCS) is the intrinsic viscosity (IV) [dl/g] of the xylene cold soluble (XCS) fraction of the heterophasic propylene copolymer (HECO), and
IV (XCI) is the intrinsic viscosity (IV) [dl/g] of the xylene cold insoluble (XCI) fraction of the heterophasic propylene copolymer (HECO).

7. A polyolefin composition (PO) according to claim 6, wherein the heterophasic copolymer (HECO):
(a) complies with the in-equation (3):

$$\frac{MFR(M)}{MFR(T)} \leq 4.0 \qquad (3)$$

wherein;
MFR (M) is the melt flow rate MFR$_2$ (230° C.) measured according to ISO 1133 (g/10 min) of the (semi)crystalline polypropylene (PP);
MFR (T) is the melt flow rate MFR$_2$ (230° C.) measured according to ISO 1133 (g/10 min) of the heterophasic propylene copolymer (HECO); and/or
(b) has a comonomer content in the range of 8.5 to 25 mol %; and/or
(c) wherein the intrinsic viscosity (IV) of the xylene cold insoluble (XCI) fraction of the heterophasic propylene copolymer (HECO) is in the range of 1.15 to 1.35 dl/g.

8. A polyolefin composition (PO) according to claim 1, wherein:

(a) the (semi)crystalline polypropylene (PP) is a (semi)crystalline propylene homopolymer (H-PP) having a xylene cold soluble (XCS) fraction of less than 4.5 wt. %; and/or
(b) the elastomeric propylene copolymer (ESC) is an ethylene propylene rubber (EPR).

9. The polyolefin composition (PO) of claim 1, comprising:
(a1) 70 to 90 wt. %, based on the total weight of the polyolefin composition (PO), of the heterophasic propylene copolymer (HECO); and
wherein said heterophasic propylene copolymer (HECO):
(i) has a xylene cold soluble (XCS) fraction in the range of 27 to 35 wt. %, having a comonomer content in the range of 30.0 to 65.0 mol % and an intrinsic viscosity (IV) in the range of 1.90 to 2.18 dl/g;
(ii) has a melt flow rate MFR$_2$ (230° C.) measured according to ISO 1133 in the range of 18 to 35 g/10 min;
(iii) complies with the in-equation (2):

$$1.40 \leq \frac{IV(XCS)}{IV(XCI)} \leq 1.80 \qquad (2)$$

wherein;
IV (XCS) is the intrinsic viscosity (IV) [dl/g] of the xylene cold soluble (XCS) fraction of the heterophasic propylene copolymer (HECO), and IV (XCI) is the intrinsic viscosity (IV) [dl/g] of the xylene cold insoluble (XCI) fraction of the heterophasic propylene copolymer (HECO).

10. The polyolefin composition (PO) according to claim 1, wherein the polyolefin composition (PO) consists of:
(a1) at least 75 wt. % based on the total weight of the polyolefin composition (PO), of the heterophasic propylene copolymer (HECO);
(b1) 2 to 15 wt. % based on the total weight of the polyolefin composition (PO), of the high density polyethylene (HDPE) as defined herein;
(c1) optionally up to 5.0 wt. %, based on the total weight of the polyolefin composition (PO), of alpha nucleating agents (NU); and
(d1) optionally up to 8.0 wt. % based on the total weight of the polyolefin composition (PO), of additives (AD); or
(a2) at least 75 wt. % on the total weight of the polyolefin composition (PO), of the heterophasic propylene copolymer (HECO);
(b2) 2 to 15 wt. based on the total weight of the polyolefin composition (PO), of the inorganic filler (F);
(c2) optionally up to 5.0 wt. % based on the total weight of the polyolefin composition (PO), of alpha nucleating agents (NU); and
(d2) optionally up to 8.0 wt. based on the total weight of the polyolefin composition (PO), of additives (AD).

11. The polyolefin composition (PO) according to claim 1, consisting of:
(a) 70 to 90 wt. based on the total weight of the polyolefin composition (PO), of the heterophasic propylene copolymer (HECO);
(b) 2 to 15 wt. % based on the total weight of the polyolefin composition (PO), of the high density polyethylene (HDPE); and
(c) 5 to 20 wt. %, based on the total weight of the polyolefin composition (PO), of the inorganic filler (F);

(d) $10^{-5}$ to 2.0 wt. %, based on the total weight of the polyolefin composition (PO), of alpha nucleating agents (NU); and (e) optionally up to 8.0 wt. % based on the total weight of the polyolefin composition (PO), of additives (AD).

12. The polyolefin composition (PO) according to claim 1, wherein:

(a) the polyolefin composition (PO) has a melt flow rate $MFR_2$ (230° C.) measured according to ISO 1133 in the range of 15 to 40 g/10 min; and/or (b) the high density polyethylene (HDPE) has a melt flow rate $MFR_2$ (190° C.) measured according to ISO 1133 in the range of 20 to 80 g/10 min.

13. The polyolefin composition (PO) according to claim 1, wherein:

(a) the weight ratio between the inorganic filler (F) and the high density polyethylene (HDPE) [(F)/(HDPE)] is at least 0.6; and/or (b) the weight ratio between the xylene cold soluble (XCS) fraction of the heterophasic propylene copolymer (HECO) and the high density polyethylene (HDPE) [(XCS)/(HDPE)] is above 2.0; and/or (c) the weight ratio between the heterophasic propylene copolymer (HECO) and the high density polyethylene (HDPE) [(HECO)/(HDPE)] is in the range of 5/1 to 25/1.

14. The polyolefin composition (PO) according to claim 1, wherein the inorganic filler (F) has a cutoff particle size d95 [mass percent] of equal or below 3.3 μm.

15. The polyolefin composition (PO) according to claim 1, wherein the polyolefin composition (PO) has:

(a) tensile modulus of at least 1100 MPa; and/or (b) impact strength at +23° C. of at least 20 kJ/m$^2$; and/or (c) a coefficient of linear thermal expansion (CLTE) performed in a temperature range from −30 to +80° C. of not more than 80 μm/mK.

\* \* \* \* \*